United States Patent Office

Re. 26,001
Reissued Apr. 26, 1966

26,601

DIFFUSION COATING OF METALS

Richard L. Wachtell, Scarsdale, and Charles A. De Quisto, Elmsford, N.Y., assignors to Chromalloy Corporation, West Nyack, N.Y.

No Drawing. Original No. 3,073,015, dated Jan. 15, 1963, Ser. No. 29,150, May 16, 1960. Application for reissue Jan. 12, 1965, Ser. No. 438,449
7 Claims. (Cl. 29—183.5)

Matter enclosed in heavy brackets [ ] appears in the original patent but forms no part of this reissue specification; matter printed in italics indicates the additions made by reissue.

This invention relates to the diffusion of metals for the production thereon of an outer strength-increasing coating or layer of enhanced oxidation and thermal shock resistance at high temperatures and, more particularly, to the production of such a coating including aluminum and chromium and silicon by diffusion coating techniques on various articles formed from the so-called "superalloys," such as high-nickel and high-cobalt alloys, for high temperature uses and applications.

Metallurgical developments in recent years have indicated, particularly for high temperature uses and applications, the desirability of high-nickel and/or high-cobalt alloys (sometimes now referred to as "supperalloys") as having desirable physical properties for various high temperature uses, such as, for example, the manufacture of rotor blades and stator vanes for high temperature gas turbines where operation is desired without failure of the part even during prolonged exposure to temperatures well above 1500° F. and, consequently, substantially above the temperature range at which failure or diminution of the strength characteristics may be expected of even high temperature austenitic or nickel or chromium steels.

Although the nickel or cobalt or other superalloys mav exhibit, for a variety of uses, physical properties within a desirable range, particularly when subjected in use to extremely high temperatures, the oxidation resistance and/or erosion resistance of the surface of such alloys, the resistance to thermal shock, and the strength characteristics particularly when subjected for prolonged times to high temperatures and substantial temperature variations, may be less than desired for prolonged or severe use. The foregoing becomes particularly emphatic when it is realized that it may be desired to use such high temperature "superalloys" for various machine parts requiring some strength even while operating at temperatures close to or within the range of the softening temperature or melting temperature of the metal itself and under conditions where thermally induced softening or warping and/or damage induced by thermal shock cannot be tolerated for optimumly successful operation of the machine.

If it is attempted to increase the oxidation and thermal shock resistance of the surface of such high temperature alloys by the diffusion coating thereinto of a metal such as chromium according to conventional diffusion coating techniques, some enhancement of the oxidation resistance and other properties may be experienced, but, it has been found less than the optimum desired, particularly for extremely high temperature uses. Alternatively, also according to conventional techniques, if it is attempted to enhance the desired surface or other properties of such alloys by applying thereto a surface coating of aluminum, for example, as by an aluminum dip, etc., such a coating, however much it may initially enhance the surface characteristics, may be found to fail at particularly high temperatures. Even with a diffusion coating of aluminum, difficulty may be experienced from the deep diffusion of aluminum and some adverse effects of the diffused metal on other physical or metallurgical properties of the superalloy part.

According to this invention, however, a diffusion coating of a combination of silicon and chromium and aluminum is provided for various metal articles, particularly high temperature alloys of nickel and cobalt and the like, providing a diffusion coating of a combination of substances into the surface of the base alloy for providing oxidation and thermal shock and erosion resistance superior to that obtained by the diffusion coating of any one or any two of these three substances, and enhancing the strength characteristics of the finished and coated article, particularly at high temperatures, while diminishing the disadvantages of thermal deformation and severe thermal shock.

One object of this invention is to provide, on metal articles of the character described, a diffusion coating of enhanced resistance to oxidation and erosion and thermal shock, particularly at high temperatures, and for imparting enhanced strength characteristics to the coated article when subjected to high temperatures.

Another object of this invention is to provide a high temperature alloy article of the character described having on the surface thereof a diffusion coating of a combination of materials providing enhanced oxidation resistance for said article in use and enhanced strength characteristics for said article particularly at high temperatures to which it is subjected in use.

A further object of this invention is to provide a diffusion coating comprising silicon, chromium, and aluminum into the surface of high temperature alloys such as those having a preponderent nickel and/or cobalt base for enhanced oxidation resistance and strength increasing results at the surface of said article particularly during high temperature use thereof.

A still further object of this invention is to provide an article of predominantly nickel-containing and/or cobalt-containing base alloys and having a diffusion coated substantially continuous surface layer or case including silicon and chromium and aluminum for enhancing the oxidation resistance of said article, the thermal shock resistance thereof, and the strength characteristics thereof particularly when used in high temperature applications.

Other objects and advantages of this invention will be apparent from the following description and the appended claims.

Before considering in further detail illustrative embodiments of techniques and articles embodying and for practicing this invention, it may be useful preliminarily to consider some aspects of the type of situations or applications in which the enhanced advantages of this invention may be particularly useful. Thus, the utility and advantages of this invention are particularly to be noted in (but not limited to) the situations where various metal articles are used in applications where a substantial mechanical strength and resistance to warping and thermal shock are desired, along with oxidation resistance, at temperatures ranging above 2000° F. for prolonged periods. As will be understood, such very high temperatures are generally considered above the range of temperatures where even high temperature austenitic steels containing substantial proportions of nickel or chromium lose strength even to the point of not being self-supporting. Hence, although the teachings of this invention are applicable to provide satisfactory and advantageous diffusion coatings on such ferrous articles, the application whereof to such articles appears to present, as a practical matter, less emphatic advantages as compared to the utilization of this invention for enhancing the ultimate characteristics of articles formed from "superalloys."

Similarly, from these superalloys (such as the high nickel and high cobalt alloys noted herein), there must be distinguished the so-called "refractory metals" such as molybdenum, etc., also conventionally utilized for high temperature metallurgical application, and, perhaps, within operational temperature ranges substantially in excess of 2000° F. As will be understood, however, the founding and metallurgical characteristics of the so-called "refractory metals" and their alloys may inherently impose or introduce some difficulties or limitations in the casting, working, and/or fabrication of parts or articles from such metals, which difficulties are eliminated or mitigated or not found in the handling or casting or machining of articles produced from the so called "superalloys" as noted herein. Thus, as is well understood, the situation may arise that the "refractory metals" are not available for producing a particular part or article for high temperature use because of the inherent limitations in casting, fabricating, etc., regradless of the high temperature resistance of such metals, whereas the "superalloys," while possessing adequate characteristics for casting or fabrication or producing of the article, may not exhibit the desired high degree of creep strength, oxidation resistance, and resistance to thermal shock at the desired high temperature of operational use of the article.

In such cases, according to this invention, a base alloy which can be readily cast or formed or fabricated into the desired article can be used for the production thereof and then the oxidation resistance, thermal shock resistance, and high temperature strength characteristics of the formed article or part are satisfactorily increased by the diffusion coatings hereof to produce ultimately in the coated and finished article the operational characteristics and properties desired.

As further illustrative of the foregoing, it was desired to cast a gas turbine inlet stator vane, having relatively thin walls and made according to the so called precision casting or "lost wax" process, so that the desired founding or casting process required high fluidity of the molten metal and other founding and metallurgical requirements in the formation of the vane which were inconsistent with or difficult to accomplish with various refractory or high temperature metals or alloys which might inherently be expected to give the desired thermal stability, etc., at the high temperatures for which the vane was intended in use. By casting these vanes from a high-cobalt superalloy, adequate founding and casting and forming techniques and results were achieved. After casting of the vanes, a diffusion coating or case of silicon aluminum, and chromium was produced in the surface thereof in accordance with this invention, and it was found that such techniques not only increased the oxidation resistance at high temperature to within satisfactorily enhanced limits, but also substantially increased the overall strength of the vanes at high temperatures and made them less susceptible to warping and to damage by thermal shock in use—all to an extent and at temperatures way beyond the inherent properties or characteristics of the superalloy itself.

In another instance, involving the fabrication of a so-called "beehive" or "sandwich panel" structure consisting of flat plates or sheets with intermediate corrugated members for increased stiffness and strength with a minimal increase in weight, and material used for the fabricated panel was rolled sheets of a high-cobalt superalloy of about 0.010" thick. With the application of the silicon-aluminum-chromium diffusion coating according to this invention to the sandwich structure after fabrication, the compressive strength was increased to about twice the original value, with actual additional strength in the fabricated structure stemming, apparently, from a bonding effect adjoining the junctures between the flat plates and the corrugated members, in addition to whatever enhanced metallurgical or surface properties are imparted to the part by alloying with the diffusion coated materials.

As will be seen from the foregoing, and from the additional explanation herein, the diffusion coatings embodying and for practicing this invention do more than provide enhanced oxidation resistance to the surface of the base alloy being coated. They also appear to affect the final metallurgical properties of the finished article, as well as providing certain mechanical added characteristics which may not be wholly attributable to a purely metallurgical function or mechanism. For example, alloyed articles coated in accordance with the present invention are found to be structurally sound and retain sufficient strength or thermal shock resistance for the purposes to which they are put even at temperatures at which the lowest melting component of the base alloy core of the article is actually at or above the temperature of the softening point or melting point thereof, thus demonstrating an instance where the diffusion coated case actually increases the thermal stability and high temperature strength of the article at temperature ranges substantially above that at which the uncoated base alloy would be expected to function satisfactorily, and in addition to whatever oxidation resistance, etc., the diffusion coating may impart to the surface of the coated article.

In accordance with the present invention, it has been discovered that the advantageous production of an outer casing or coating on, particularly, nickel-containing and/or cobalt-containing "superalloy" articles by diffusion into the surface thereof of a combination of silicon, metallic chromium, and metallic aluminum, produces a layer or case of substantially enhanced resistance to oxidation and erosion, as well as a casing of good and uniform adherence to the base alloy article, even during thermal shocks and deformations to which the article may be subjected in use, and a casing which actually enhances to a substantial extent the high temperature strength and resistance characteristics of the article, substantially superior to that provided by plating or dipping techniques, or even diffusion techniques of either silicon or chromium or aluminum alone or separately as a coating or casing on the particular base alloys of the character to which this invention relates.

As will be understood, the characteristic of resistance to thermal shock is of particular importance with high temperature machine parts and, actually, is a somewhat related characteristic to the ultimate of high temperature oxidation resistance, at least, in so far as the production of an oxidation resistant coating on high temperature alloys subjected to severe thermal shock conditions becomes important if the supposedly oxidation resistant coating or outer casing is not maintained uniformly continuous in use and firmly adhered to the article during thermally induced deformation thereof so that fissures or other discontinuities may occur in the oxidation resistant coating or case as a result of thermal shock, which fissures, once having occurred, readily present easy access to the base metal of the article for axidation corrosion thereof. Such considerations, of course, become even more emphatic when the film continuity of the outer layer or casing of the diffusion coated materials is also relied upon to impart some further strength characteristics to the article at high temperatures of the order of those which would normally cause softening of the base alloy from which the part was originally cast or otherwise formed.

In the same connection, however, it should be noted that the same high degree of oxidation resistance or strength enhancing characteristics or resistance to thermal shock may not, necessarily, inhere in all types of high temperature resistant coatings which might be employed for the protection or enhancement of superalloy parts, and that one or another of different techniques may be specifically employed for concentration on whichever of the several optimum characteristics may be considered particularly desirable or ultimately important for a particular use or application.

As illustrative of the foregoing considerations, an inlet gas turbine stator vane may be subjected constantly to the extreme thermal shock of being constantly subjected in use to a temperature differential of many hundreds of degrees across merely the narrow width of the vane as when one edge is subjected to hot turbine gases, while the other edge is subjected to gases at much nearer room temperature. With such a use, the characteristic of extreme thermal shock resistance of the diffusion coating may be desirable to an extent which may outweigh characteristics of increased strength and/or long term oxidation at elevated temperatures. In such an event, one might select a diffusion coating or surface coating technique which produced or emphasized extraordinarily high shock resistance, even at the expense of oxidation resistance or strength characteristics. By contrast, one may cite the situation where, regardless of the thermal shock characteristics to which the part was subjected, the particular installation or application might require a cast "superalloy" part or article which would withstand prolonged contact with high temperature oxidizing atmospheres necessitating a high temperature oxidation resistance for hundreds of hours at, say, 2200° F. or more. In such a situation, then, one might select, for the diffusion coating of a protective layer, even on the same superalloy, of a material or technique which emphasized the oxidation resistance, even if this characteristic were obtained at the expense of thermal shock resistance.

The foregoing is particularly mentioned because, as will be understood, there may be a variety of special treatments for "superalloy" castings or other parts for enhancing one or another of the ultimate characteristics thereof, some of which may, indeed, accentuate certain ultimate characteristics at the expense of others, while surface coatings or casings in accordance with this invention may, in other situations, provide enhanced characteristics for a particular application with, even, the same base alloy. For example, the copending application, S.N. 807,025, filed April 17, 1959, relates to the diffusion coating of high-nickel and high-cobalt superalloys with a coated casing comprising a combination of chromium and aluminum for the purpose of enhancing the oxidation resistance and thermal shock resistance of metal articles as there disclosed, and it has been found that such diffusion coating layer or case may be useful for many applications for which the different silicon-chromium-aluminum diffusion coated layer or case in accordance with this invention is also useful, but there still are important distinctions between the two techniques and the results thereof.

Quite apart from the strength-enhancing characteristics at extremely high temperatures imparted to the coated superalloy articles in accordance with this invention, it has been found that, for some applications, the chromium-aluminum of the copending case actually does produce thermal shock resistance somewhat in excess of that produced by coatings in accordance with the instant invention—while, at the same time, failing to produce oxidation resistant characteristics of the order of magnitude here. Thus, considering a high temperature machine part where the specifications require that the ultimate finished article withstand without failure from thermal shock, for example, 600 cycles of being rapidly heated from room temperature up to 2000° F. and thereafter rapidly quenched, an article coated in accordance with this invention withstands 800 of such testing cycles without failure, while articles coated in accordance with the foregoing copending application might withstand 1000 such cycles. That is to say, whereas the coatings of this invention tremendously enhance the thermal shock resistance of the superalloys to an extent where parts made therefrom will pass the most rigid conventional tests, still these coatings may not enhance that particular characteristic to the same extent as the chromium-alumium coatings of said copending application.

Nevertheless, when other characteristics of the finished part become more important for consideration, diffusion coatings or surface layers or cases embodying the silicon-chromium-aluminum combination in accordance with this invention are found, in other respects, to produce results substantially in excess of the results produced by either the untreated alloy part, the same part diffusion-coated with either silicon or chromium or aluminum alone, and/or the same part diffusion-coated with any two of these three materials, including the parts of articles made in accordance with said copending application. For example, quite apart from the enhanced strength characteristics imparted to a metal article embodying this invention and at temperatures close to or at the softening point or melting point of some components of the base alloy, coatings embodying this invention provide oxidation resistance substantially above prior coatings (including those of said copending application) by as much as 20% or more. Thus, when oxidation resistance is, for the particular use or application of the finished part, of more ultimate significance than thermal shock resistance, it has been found that various articles or machine parts processed in accordance with the teachings of this invention and including a diffusion coated layer of silicon and chromium and aluminum will withstand, under the usual testing, oxidation resistance up to 2200° F. without failure, whereas other similar superalloy parts (even when treated in accordance with the aforementioned copending application) produce failures at, perhaps 2000° F., from the standpoint of ultimate and prolonged oxidation resistance for several hundred hours at such high temperatures.

As will be understood, in the comparative evaluation of the foregoing, it must be kept clearly in mind that it is possible, presumably, to use some of the refractory metals or alloys thereof or so-called "cermets" for obtaining oxidation resistance and/or thermal shock resistance of the orders of magnitude mentioned above, but such possibility is completely apart from consideration here, where the present invention relates to an appropriate treatment of the castable and readily formable superalloys to impart to the article cast or formed therefrom the desired enhanced ultimate characteristics required for a particular application. Also, any comparisons between one or another of the characteristics of thermal shock resistance or oxidation resistance or strength enhancing characteristics imparted to such superalloys and articles made therefrom by a surface coating thereon—particularly at the temperature ranges noted—must be evaluated in accordance with the particular characteristics desired and with regard to which one of the several characteristics is particularly required for a particular application or use. For example, although both the coatings in accordance with this invention and those in accordance with the above mentioned patent application produce different ultimate degrees of thermal shock resistance, both coatings are above the conventionally required demands for thermal shock resistance.

By contrast, however, considering, particularly, for example, a turbin blade or other part of a gas turbine engine of present design, despite the fact that both coating techniques would produce, from the same superalloy, a metal article or part which would more than satisfy the particular requirements of the part as to thermal shock resistance, the failure of the coating of the copending application at 2000° F. would not satisfy the requirements of the particular application or use which demanded an oxidation resistance which will withstand prolonged exposure to a temperature of 2200° F. without failure. As the various industries requiring such readily castable yet high temperature resistant materials have developed today, particularly with regard to the extremes of temperatures noted, a machine part or metal alloy article which will withstand or pass an oxidation resistant test up to 2000° F. (but will not withstand the test of 2200° F. as does an article treated in accordance with this invention) is not merely "not quite so good" as an article coated or treated in accordance with this invention; it is actually unsatisfactory or inoperative in a situation requiring the higher degree of oxidation resistance provided by the instant invention.

Thus, there may be superalloy articles having surface treatments thereof which permit them to exceed articles coated in accordance with this invention with respect to the one characteristic of thermal shock resistance, but which cannot withstand an oxidation resistant test to a high temperature level of articles in accordance with this invention. There may also be refractory metal or cermet articles which can withstand oxidation resistance and/or thermal shock impact far in excess of articles treated in accordance with this invention; yet the very refractory metal from which they are produced precludes using such materials in the formation of the particular articles to which this invention pertains.

Accordingly, this invention, with its production of a strength increasing, oxidation resistant, thermal shock resistant coating or surface layer or case of silicon and chromium and aluminum, produces on readily castable or formable or fabricatable articles of the superalloys an ultimate product meeting the specifications and tests and characteristics required for the high temperature machine parts or metal articles desired; and these enhanced advantages are obtained, in accordance with this invention, without regard to the fact that techniques and processes and articles produced thereby and embodying or in accordance with this invention may not necessarily exceed all other articles with regard to all high temperature properties, as suggested and will be understood by the foregoing comments.

Although the techniques in coatings embodying and for practicing this invention are satisfactorily applicable to a variety of various metal alloy articles, as noted above, they are particularly adapted for use with base metal alloys containing a substantial or preponderant proportion of nickel or of cobalt—e.g., such superalloys as are particularly formulated for high temperature use and having physical properties and a useful life as desired when subjected for prolonged duration to both very high temperatures and to the severe thermal shocks of rapid changes or great differentials of temperatures over wide ranges.

Merely as illustrative of the types of high temperature alloys for which this invention is particularly adapted, one may note a commercial nickel-base alloy sold by Utica Metals Division of Kelsey-Hayes Corporation under the designation of "Udimet 500, a cobalt-base alloy commercially manufactured and sold by the Haynes-Stellite Division of Union Carbide Corporation under the designation "X-40," as well as another cobalt-base alloy, also commercially manufactured and sold by Haynes-Stellite, under the designation "HS-25." Such alloys have approximately the following compositions (according to the respective manufacturers' specifications) in weight percent.

| | Percent |
|---|---|
| High nickel alloy: | |
| ("Udimet 500")— | |
| Carbon | 0.12 |
| Chromium | 19 |
| Cobalt | 19 |
| Iron | 1 |
| Molybdenum | 4 |
| Aluminum | 3 |
| Titanium | 3 |
| Nickel | Balance |
| High cobalt alloys: | |
| ("X-40")— | |
| Carbon | 0.5 |
| Chromium | 24.5 |
| Nickel | 10.5 |
| Tungsten | 7.4 |
| Iron | 1 |
| Cobalt | 55 |
| ("HS-25")— | |
| Carbon | 0.1 |
| Chromium | 20 |
| Nickel | 10 |
| Tungsten | 15 |
| Cobalt | 50 |
| Iron (approx.) | Balance |

Also illustrative of the type of base material with which satisfactory results are achieved in accordance with this invention are the high temperature alloy steels, particularly the austenitic steels and very low carbon steels and alloys having substantial proportions of nickel and cobalt, although, as previously mentioned, the enhanced advantages attributable to this invention may be, for practical or economic or commercial reasons, less emphatic than with the nickel and cobalt superalloys noted.

Also, as further illustrative of the procedures and coatings and techniques embodying and for practicing this invention, it may be noted that the articles of such high temperature alloys for which this invention is particularly adapted are satisfactorily produced or coated by procedures including embedding the metal article to be coated in a dry powder pack including an inert mineral filler material, a source of the silicon, chromium, and aluminum elements [to be diffusion coated], and a source of a vaporizable halogen material. As embedded in such a pack (preferably contained within a metal container or retort the seams of which are sealed by a fusible material such as a low melting silicate to prevent excessive escape of the diffusing materials during heating and also excessive introduction of air into the pack during cooling), the articles are heated—all in known manner—to a substantial temperature for a number of hours to cause diffusion coating of the desired materials into the base metal article surfaces, in conjunction with the elemental halogen reagent, etc.

Satisfactory results have been achieved according to this invention in so coating metal articles formed from any of the illustrative alloys mentioned above with the use of a coating pack comprising, as illustrative of this invention, approximately 60% alumina as the inert mineral filler, 30% chromium metal, 8% aluminum metal, 2% silicon (the last mentioned as the three components to form the diffusion coating), and up to 1% ammonium iodide as the vaporizable halogen source, the foregoing percentages being by weight. With such a pack enclosed in a container in known manner for producing diffusion coatings for various materials on various metallic alloys, satisfactory results have been achieved according to this invention by heating the articles of the high nickel or cobalt content in such a pack for from four to twenty hours at temperatures of from about 1650° F. to 2100° F.

In connection with the foregoing ranges, it should be noted that, if thinner coating layers or cases are desired (e.g., where severe thermal shock and deformation of the articles are anticipated), the diffusion coating is carried out, preferably, at the lower temperatures and/or for shorter times within the foregoing ranges. Where thicker cases or coated layers may be desired (e.g., where oxidation and erosion resistance and strength increasing are of more importance than resistance to possible disruption of the coating layer or casing by thermal shock), the diffusion coating step is conducted at higher temperatures and/or for longer times, thereby appropriately controlling the thickness of the diffused coating layer or casing produced in accordance with this invention.

As will be understood by men skilled in the art of diffusion coating of metals, the proportions of materials, and the materials themselves, suggested in the above mentioned pack may be varied over fairly wide ranges. Thus, the proportion of inert filler is not critical and, although alumina is a preferred filler material for such pack, other inert fillers are satisfactory. Similarly, other halogen sources than ammonium iodide mentioned above give satisfactory results (e.g., elemental iodine, ammonium fluoride, etc.) provided they are capable of producing a vaporized halogen at the temperature and under the conditions of operation, which halogen will act as a transfer agent or energizer or aid for the introduction of the silicon and chromium and aluminum (or intermetallic complexes thereof) into the surface of the metal article being coated. Also as noted, the time and temperature conditions of the diffusion coating step may, to some extent, be varied, depending upon the thickness of the coating or outer layer or casing desired. Satisfactory results have been achieved with coatings of the order of 0.001" to 0.002" thick, although even thinner coatings give substantially enhanced oxidation and other protection to the base alloy and provide the strength increasing characteristics therefor, and, for some applications, thicker coatings may be desired.

Similarly, the relative proportioning of chromium to silicon to aluminum in the material of the diffusion coating or layer or case may vary considerably depending upon the final characteristics desired, it being understood, of course, that equilibrium conditions may obtain in the coating pack (with regard to the halides of the coating materials as well as intermediate or intermetallic complexes thereof) over fairly wide ranges. It has been noted, for example, that, as the proportion of aluminum in the diffusion coating is increased, a somewhat rougher coating surface is obtained (particularly, with alloys in which the iron component thereof is larger than those mentioned above) and that the depth or thickness of the coating (particularly the aluminum component thereof) has some effect upon the ultimate metallurgical characteristics of the coated article while, of course, the extent to which the silicon component of the coating becomes alloyed with or included in the base metal has its own metallurgical effect on the final characteristics of the finished article.

For example, it has been found that, generally speaking, increasing the proportion of aluminum in the final diffusion coating enhances the oxidation resistance of the finished coating, but also increases the brittleness (or decreases the ductility) of the finished coating layer or case. Similarly it has been noted that the relative proportioning of the three components of the coated layer or case appears to be, generally, a function of the temperature at which the coating operation is conducted, at least for a given proportioning of the three components in the coating pack, [and with lower temperatures resulting in a lower diffusion of chromium into the surface being treated].

In addition to the foregoing illustrative examples, it may be generally noted that the proportions of the three constituents silicon and aluminum and chromium are satisfactorily provided in the coating pack within approximately the following ranges: 15%–50% chromium, 1%–20% aluminum, and 0.5%–15% silicon. Also it has been noted that, if the total or aggregate of the silicon-aluminum-chromium content of the pack exceeds approximately 60% of the total pack composition, there may be a tendency for some undesired sintering of the pack components during the heating step, and, at the other extreme, operable or satisfactory diffusion of the several elements desired is obtained in packs which have as little as 5% of the total composition composed of the silicon and aluminum and chromium elements [to be coated].

As will be apparent, of course, within the range of avoiding undesired side effects, some enhancement or efficiency may be produced by providing as high as practicable a proportioning in the coating pack of the [three] elements desired to be diffused into the surface of the articles embedded in the pack, as may be consistent, of course, with the size and shape and volume and quantity of the embedded articles as related to the volume of the pack ingredients. As noted, also, the final composition or the actual ratios in the finished coating will or may be varied in accordance with the foregoing considerations, but, as illustrative, a pack in accordance with the foregoing example mentioned above produces a coating where the constituents may be present approximately in the ratios of 90 aluminum to 5 chromium to 5 silicon by weight in the particular alloys mentioned and when coated in the preferred temperature range of about 1800°–2100° F.

In accordance with this invention, then, there is provided for the diffusion coating into high temperature alloys of a combination of silicon, *and* aluminum, [and chromium] under such circumstances where an outer coated layer or case is provided for increasing the oxidation resistance, strength, thermal shock resistance, and other properties of a metal part or article fabricated or founded or formed from an initial material or base alloy desirably susceptible to the fabrication or founding or assembly techniques necessary or desired for the particular shape and formulation of the part or article. As noted above, and as will be understood by men skilled in this art, the teachings of this invention are particularly applicable to high-nickel and high-cobalt "superalloys," although the teachings of the invention produce enhanced thermal shock and oxidation resistance to other materials, particularly primarily ferrous articles. For example, satisfactorily enhanced results are produced by this invention on various types of stainless steel having high (e.g. 35%) chromium and nickel contents and on various austenitic steels with or without substantial proportions of nickel and chromium and particularly on steels with low carbon contents; nevertheless, regarding such essentially ferrous base alloys or materials, the particular economical considerations from time to time may indicate that a maximum oxidation resistance on such materials may be obtained by means less expensive than the techniques disclosed herein, so that, although these techniques produce operative and enhanced characteristics on such other materials, economic considerations may indicate that the practical use of the techniques disclosed herein should be primarily relegated to the treatment of the high temperature superalloys for achieving the high degree of oxidation resistance and thermal shock resistance as noted herein.

*Although the enhanced results of this invention are achieved with a coating pack comprising all three of the elements silicon, aluminum, and chromium, it now appears (from analyses of the coated products accomplished by well understood micro-probe techniques) that little, if any, chromium is diffusion coated into the final coated article from the pack; but, rather, that the chromium constituent of the coating layer on the coated article originates from the initial chromium content of the alloy base metal article (which, from the illustrative examples noted above, is substantial and of the order of 19% or more). Whether or not the foregoing be true or merely a hypothesis, it nevertheless results, in accordance herewith, that the subjecting of such "superalloy" articles to the coating steps and in a diffusion coating pack as described produces the enhanced results noted under the operating conditions disclosed above.*

It is of course to be understood that the foregoing description is illustrative only and that numerous changes may be made in the conditions, proportions, and ingredients specifically disclosed without departing from the spirit of the invention as defined in the appended claims.

What is claimed is:

1. In a method for the production of a diffusion coating of the character described on the surface of an homogeneous alloy base metal article having high temperature resistant characteristics and including a preponderant proportion of a metal selected from the group consisting of nickel and cobalt, *and a substantial chromium content,* the steps which comprise embedding said alloy base metal article in a diffusion coating pack including chromium metal and aluminum metal and silicon for diffusion coating into the surface of said base alloy and a source of vaporizable halogen material as a carrier for said [chromium and] aluminum and silicon in said diffusion coating thereof, heating said base alloy in said pack effecting diffusion coating of said [chromium and] aluminum and silicon together into the surface of said article.

2. In a method for the production of a diffusion coating of the character described in the surface of an homogeneous alloy base metal article having high temperature characteristics and including a preponderant proportion of a material from the group consisting of nickel *and* cobalt, *and a substantial chromium content,* the steps which comprise embedding said alloy base metal article in a diffusion coating pack including separate sources of chromium and aluminum and silicon for diffusion coating into the surface of said base alloy and a source of vaporizable halogen material as a carrier for said [chromium and] aluminum and silicon in said diffusion coating thereof, heating said base alloy in said pack to a temperature of the order of approximately at least 1650° F. effecting diffusion coating of said [chromium and] aluminum and silicon into the surface of said article to produce said diffusion coating thereon.

3. In a method for the production of a diffusion coating of the character described for enhancing the corrosion resistance and thermal shock resistance of an homogeneous alloy metal article including a preponderant proportion of nicked and cobalt, *and a substantial chromium content,* the steps which comprise embedding said article in a diffusion coating pack including an inert mineral filler, separate sources of elemental chromium and aluminum and silicon for diffusion coating into the surface of said article, and a source of vaporizable halogen material as a carrier for said chromium and aluminum and silicon in the diffusion coating thereof, heating said article and said pack together effecting diffusion coating of said chromium and aluminum and silicon into the surface of said article to produce said oxidation resistant and thermal shock resistant coating thereon.

4. In a method for the production of a diffusion coating of the character described for enhancing the corrosion resistance and thermal shock resistance of an homogeneous alloy metal article including a preponderant proportion of nickel and cobalt, *and a substantial chromium content,* the steps which comprise embedding said article in a diffusion coating pack including an inert mineral filler, separate sources of elemental chromium and aluminum and silicon for diffusion coating into the surface of said article, and a source of vaporizable halogen material as a carrier for said [chromium and] aluminum and silicon in the diffusion coating thereof, heating said article and said pack together effecting diffusion coating of said [chromium and] aluminum and silicon into the surface of said article to produce said oxidation resistant and thermal shock resistant coating thereon, said chromium and aluminum and silicon being present in said pack in amounts by weight of about 15%–50% chromium, 1%–20% aluminum and 0.5%–15% silicon.

5. In a method for the production of a diffusion coating of the character described for enhancing the corrosion resistance and thermal shock resistance of an homogeneous alloy metal article including a preponderant proportion of nickel and cobalt, *and a substantial chromium content,* the steps which comprise embedding said article in a diffusion coating pack including an inert mineral filler, separate sources of elemental chromium and aluminum and silicon for diffusion coating into the surface of said article, and a source of vaporizable halogen material as a carrier for said [chromium and] aluminum and silicon in the diffusion coating thereof, heating said article and said pack together effecting diffusion coating of said [chromium and] aluminum and silicon into the surface of said article to produce said oxidation resistant and thermal shock resistant coating thereon, said chromium and aluminum and silicon being present in said pack as approximately 5%–60% thereof.

6. A metal article of the character described and susceptible to long exposure to oxidizing and thermal shock conditions which comprises an homogeneous base metal alloy including a preponderant proportion of at least one of the metals nickel and cobalt, *and a substantial chromium content,* and which article is enclosed within an outer layer diffusion coated case comprising chromium and aluminum and silicon.

[7. A metal article of the character described and susceptible to long exposure to oxidizing and thermal shock conditions which comprises an homogeneous base metal alloy including a preponderant proportion of at least one of the metals nickel and cobalt, and which article is enclosed within an outer layer diffusion coated case comprising chromium and aluminum and silicon, and in which said chromium and aluminum and silicon are present in said outer layer diffusion coated case in approximately the ratios by weight of 90% aluminum to 5% chromium to 5% silicon.]

8. A metal article of the character described and susceptible to long exposure to oxidizing and thermal shock conditions and which comprises an homogeneous base metal alloy including a preponderant proportion of at least one of the metals nickel and cobalt, *and a substantial chromium content,* and which article is enclosed within an outer layer diffusion coated case comprising [chromium and] aluminum and silicon, said outer layer diffusion coated case being at least about 0.001"–0.002" thick over said article.

References Cited by the Examiner

The following references, cited by the Examiner, are of record in the patented file of this patent or the original patent.

UNITED STATES PATENTS

| | | |
|---|---|---|
| 2,612,442 | 9/1952 | Goetzel. |
| 2,801,187 | 7/1957 | Galmiche. |
| 2,809,127 | 10/1957 | Gibson. |
| 2,811,466 | 10/1957 | Samuel. |
| 2,955,958 | 10/1960 | Brown. |

FOREIGN PATENTS

| | | |
|---|---|---|
| 582,241 | 3/1947 | Great Britain. |
| 722,797 | 2/1955 | Great Britain. |

MURRAY KATZ, *Primary Examiner.*

RICHARD D. NEVIUS, R. S. KENDALL,
*Assistant Examiners.*